(12) United States Patent
Kikuchi et al.

(10) Patent No.: US 7,431,210 B2
(45) Date of Patent: Oct. 7, 2008

(54) IMAGE FORMING APPARATUS, IMAGE PROCESSING APPARATUS AND METHOD

(75) Inventors: Michio Kikuchi, Kanagawa (JP);
Hitoshi Ogatsu, Kanagawa (JP);
Masahiko Kubo, Kanagawa (JP);
Shinsuke Sugi, Kanagawa (JP);
Yoshifumi Takebe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 274 days.

(21) Appl. No.: 11/344,188

(22) Filed: Feb. 1, 2006

(65) Prior Publication Data
US 2007/0041060 A1    Feb. 22, 2007

(30) Foreign Application Priority Data
Aug. 22, 2005   (JP)   ............... 2005-239672

(51) Int. Cl.
*G06K 7/00*   (2006.01)
(52) U.S. Cl. .................. 235/438; 235/451; 235/454
(58) Field of Classification Search ........... 235/451, 235/454, 438; 358/504; 355/88; 399/74
See application file for complete search history.

(56) References Cited

U.S. PATENT DOCUMENTS 5,629,990 A  *  5/1997  Tsuji et al. ............... 382/324
5,995,248 A  *  11/1999  Katori et al. .............. 358/2.1

FOREIGN PATENT DOCUMENTS

| JP | 11004346 A | * | 1/1999 |
| JP | A 11-177824 | | 7/1999 |

* cited by examiner

*Primary Examiner*—Seung H Lee
(74) *Attorney, Agent, or Firm*—Oliff & Berridge, PLC (57) ABSTRACT

An image forming apparatus includes: an image processing section for performing tone correction of an image signal; and an image output section for outputting an image in accordance with an image recording signal output, wherein the image processing section includes: a tone correction processing unit which, in accordance with an input image signal, outputs the image signal having undergone tone correction; a density calculation unit for calculating a density value at a given position in a scanning direction of a test pattern image in accordance with an image signal pertaining to the input test pattern image; and a discrimination unit for discriminating whether or not density inconsistencies having arisen at the given position in the scanning direction can be corrected by the tone correction processing unit, on the basis of the density value calculated by the density calculation unit and a predetermined threshold value.

15 Claims, 8 Drawing Sheets

IMAGE FORMING APPARATUS, IMAGE PROCESSING APPARATUS AND METHOD

CROSS-REFERENCE TO RELATED APPLICATION

This application claims priority under 35 USC 119 from Japanese Patent Application No. 2005-239672, the disclosure of which is incorporated by reference herein.

BACKGROUND

1. Technical Field

The present invention relates to an image forming apparatus, particularly to image forming processing to be performed by the image forming apparatus, such as, for example, a copying machine, a facsimile, a printer, or the like, 2. Related Art During long-term operation of an image forming apparatus of an electro-photographic type, in some cases, an output result thereof includes a streak extending in a sub scanning direction, and density inconsistencies with respect to a main scanning direction. To this end, a variety of correction methods for eliminating such a streak and density inconsistencies have been proposed. An example method for correcting density inconsistencies is performed such that: a given test pattern is output for ascertainment of a current level of density inconsistencies of an image forming apparatus; subsequently, an image of the thus-output test pattern is read by an image reading section, or the like, provided in the image forming apparatus; the degree of the density inconsistencies, and the like, is determined on the basis of the thus-read test pattern image; and image signals are corrected (converted) in accordance with the thus-determined degree of the density inconsistencies, and the like, thereby attaining correction of the density inconsistencies.

SUMMARY

According to one aspect of the present invention, there is provided an image forming apparatus includes: an image processing section for performing tone correction of an image signal, and an image output section for outputting an image in accordance with an image recording signal output by the image processing section. The image processing section includes: a tone correction processing unit which, in accordance with an input image signal, outputs an image signal having undergone tone correction; a density calculation unit for calculating a density value at a given position in a scanning direction of a test pattern image in accordance with an image signal pertaining to the input test pattern image; and a discrimination unit for discriminating whether or not density inconsistencies having arisen in the given position in the scanning direction can be corrected by the tone correction processing unit, on the basis of the density value calculated by the density calculation unit and a predetermined threshold value.

According to another aspect of the invention, there is provided an image processing apparatus includes: a density calculation unit for calculating a density value of a plurality of sub scanning directions of a given position in a main scanning direction of a test pattern image in accordance with an image signal pertaining to the input test pattern image; and a discrimination unit for discriminating whether or not density inconsistencies having arisen at the given position in the main scanning direction can be corrected through tone correction processing, on the basis of the density value calculated by the density calculation unit.

According to yet another aspect of the invention, there is provided an image processing method includes: calculating a density value at a given position in the scanning direction of the test pattern image; and discriminating whether or not density inconsistencies having arisen at the given position in the scanning direction can be corrected through tone correction processing, on the basis of the density value calculated.

BRIEF DESCRIPTION OF THE DRAWINGS

These and other objects and advantages of this invention will become more fully apparent from the following detailed description taken with the accompanying drawings in which.

DETAILED DESCRIPTION

It is known that a streak and density inconsistencies stem from a variety of causes, including some causes which cannot be resolved by means of correction of image signals, such as inadequate cleaning or trimmer clogging. When correction of image signals is performed against such a streak and density inconsistencies which cannot be resolved by correction of image signals, toner is to be wasted for no purpose. Therefore, desirably, a determination is made as to whether or not a streak and density inconsistencies having arisen in an output result can be resolved by correction of image signals.

An embodiment of the invention will now be described in detail by reference to the drawings.

Figure 1:
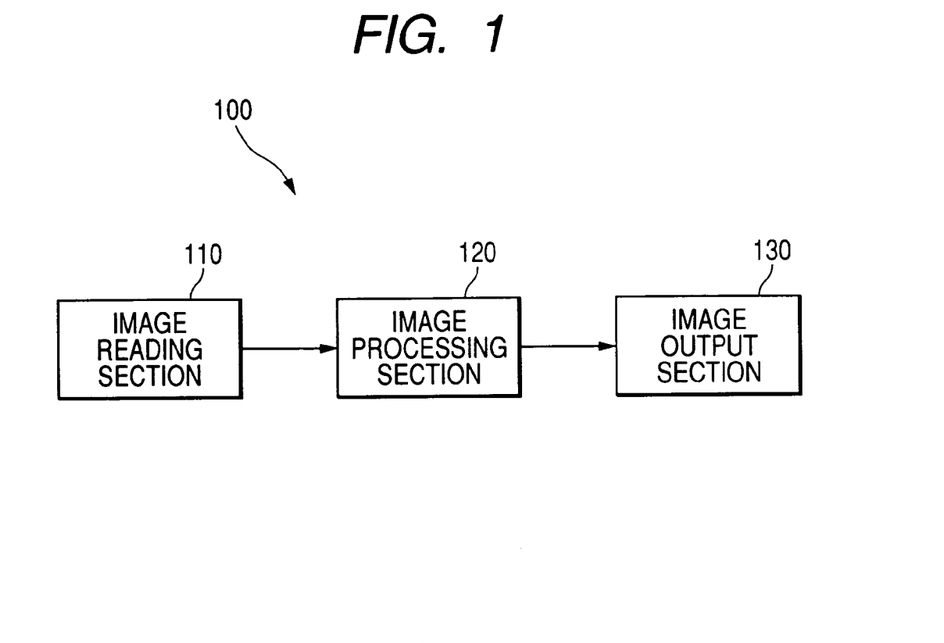
FIG. 1 is a diagram illustrating a configuration of an image forming apparatus to which the present invention is applied.

FIG. 1 is a diagram illustrating the configuration of an image forming apparatus to which the present invention is applied. As illustrated in the diagram, an image forming apparatus 100 to which the invention is applied has an image reading section 110, an image processing section 120, and an image output section 130.

The image reading section 110, which is provided for inputting various images to the image forming apparatus 100, is formed from, e.g., a flatbed scanner unit which optically reads data on a document image, and converts the same into digital image data. The image reading section 110 has, e.g., a platen glass (a document table), a light source, a mirror, a line sensor (CCD), and the like.

The image processing section 120 performs various kinds of image processing on an image signal input from the image reading section 110. For instance, the image processing section 120 performs color-conversion processing (e.g., conversion into YMCK data) of an image signal (e.g., RGB data) input from the image reading section 110; thereafter performs tone correction processing for respective color components; and outputs the same as an image recording signal to be output from the image output section 130. Detailed description about the image processing section 120 will be provided later.

The image output section 130 outputs an image created in accordance with image-recording signals—input from the image processing section 120—to a transfer sheet. The image output section 130 is formed from, e.g., an electro-photographic-type printer unit; and has, e.g., a photosensitive member, an electrifying device, an exposure device, a development device, a fuser, a cleaning device, and the like.

Figure 2:
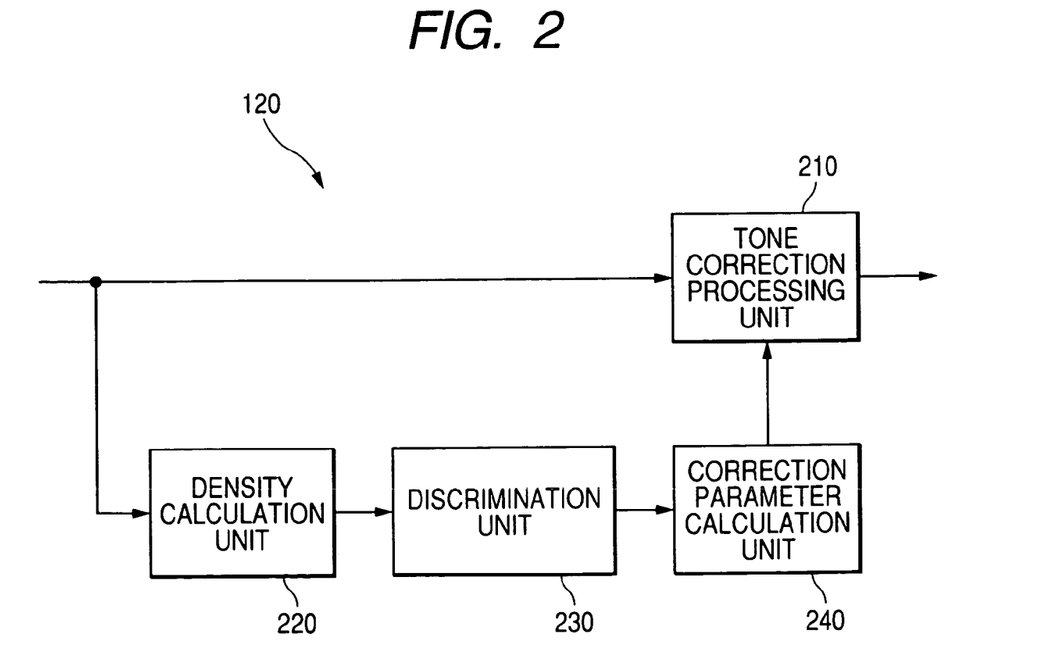
FIG. 2 is a diagram illustrating a functional configuration of an image processing section 120 according to the invention.

FIG. 2 is a diagram illustrating a functional configuration of the image processing section 120 according to the invention. The diagram depicts only constituents related to the present invention.

As illustrated in the diagram, the image processing apparatus 120 has a tone correction processing unit 210, a density calculation unit 220, and a correction parameter calculation unit 230.

The tone correction processing unit 210 performs tone correction processing of an image signal (e.g., YMCK data) which has undergone color conversion by a color conversion processing unit (not shown); and outputs, in accordance with an input image signal, a correction parameter (the image signal having undergone the tone correction). The tone correction processing unit 210 is provided for, e.g., respective color components (e.g., YMCK); and includes a look-up table (LUT) for storing a corresponding correction parameter into an address corresponding to an input color signal. In addition, in the present embodiment, the main scanning direction (the direction parallel with a rotary shaft of the photosensitive member) of the image output section 130 is divided into a plurality of regions, and an LUT is provided for each of the divided regions. Hence, the tone correction characteristic can be caused to vary for each of the positions in the main scanning direction. Accordingly, the image forming apparatus 100 appropriately updates the correction parameters for use in tone correction so as to vary the tone correction characteristic for each of the positions in the main scanning direction, thereby correcting a streak extending in the sub scanning direction of the image, and density inconsistencies with respect to the main scanning direction, both of which arise in the image output section 130.

The density calculation unit 220 calculates an average density of each of patches—which form the test pattern image— for each of given positions (divided regions) in the main scanning direction on the basis of the test pattern image having been read by the image reading section 110.

Figure 3:
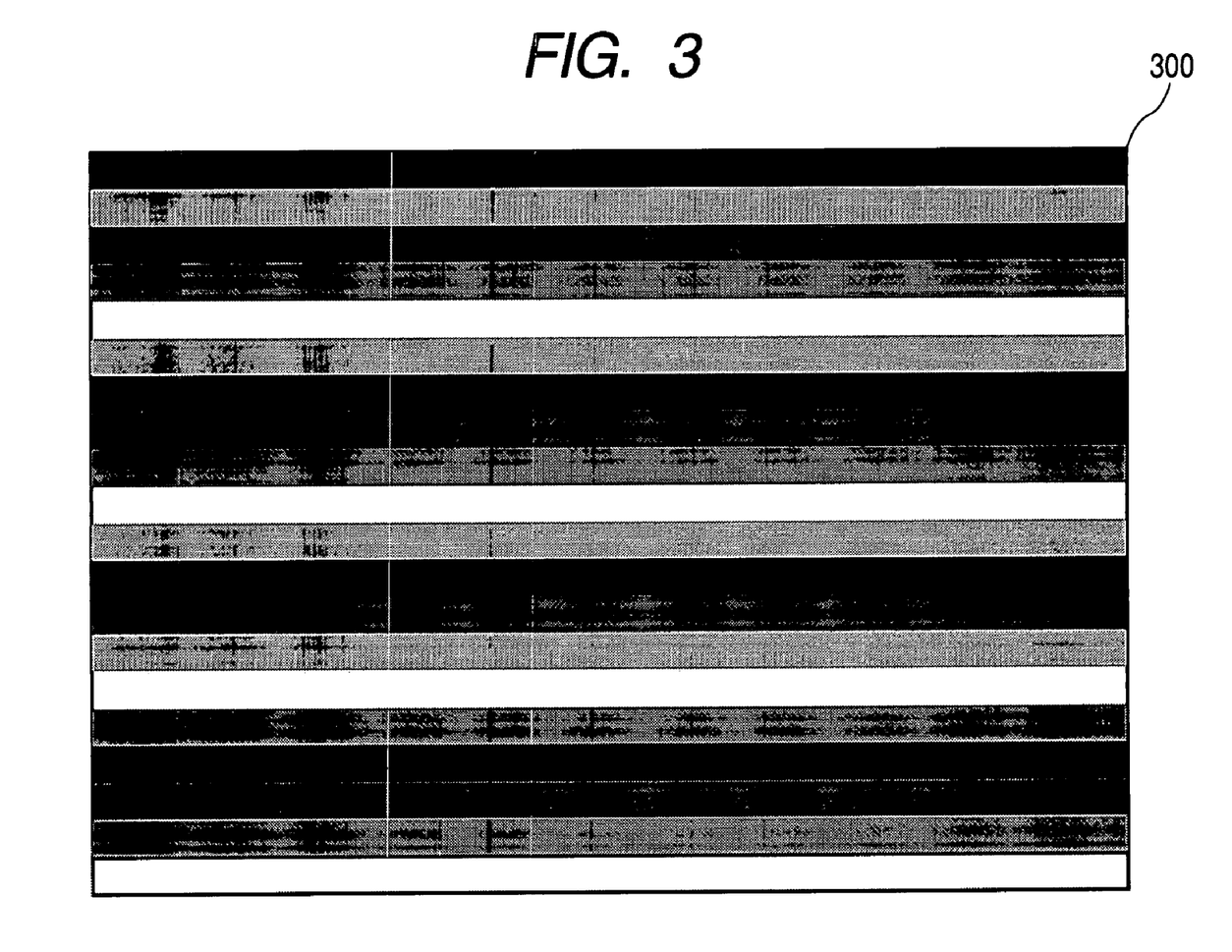
FIG. 3 is a diagram illustrating an example test pattern image to be utilized in the invention.

FIG. 3 is a diagram illustrating an example test pattern image utilized in the invention. As illustrated in the diagram, a plurality of belt-like patches (20 patches in the illustrated example), each having a uniform density in the main scanning direction of the image output section 130, are aligned along the sub scanning direction of the image output section 130 in a test pattern image 300 of the present example. Meanwhile, the density level for each of the patches is provided in five levels in the test pattern image 300, and four patches having the same density are arranged in a distributed manner. More specifically, the test pattern image 300 has density levels which differ among positions in the sub scanning direction, and which vary along the sub scanning direction. Meanwhile, the number of levels of tone and the number of patches having the same density are selected appropriately in accordance with an accuracy required for the tone correction, performance of the image reading section 110, and the like.

Figure 4:
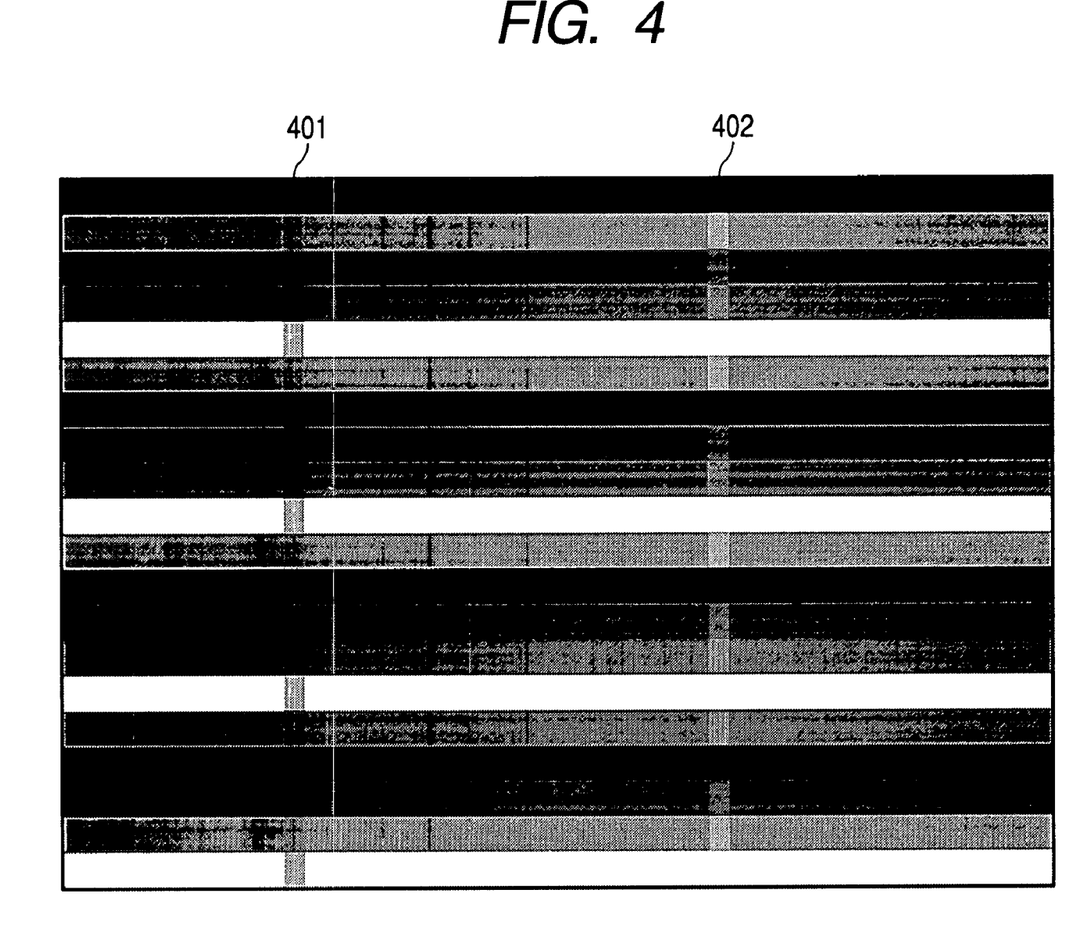
FIG. 4 is a diagram illustrating an example output result of the test pattern image depicted in FIG. 3, output by an image output section 130.

FIG. 4 is a diagram illustrating an example output result of the test pattern image depicted in FIG. 3, output by the image output section 130. As illustrated in the diagram, in this case, there arises a density inconsistency (streak) 401 whose density deviates to a higher level than a desired density, or a density inconsistency (streak) 402 whose density deviates to a lower level.

Figure 5:
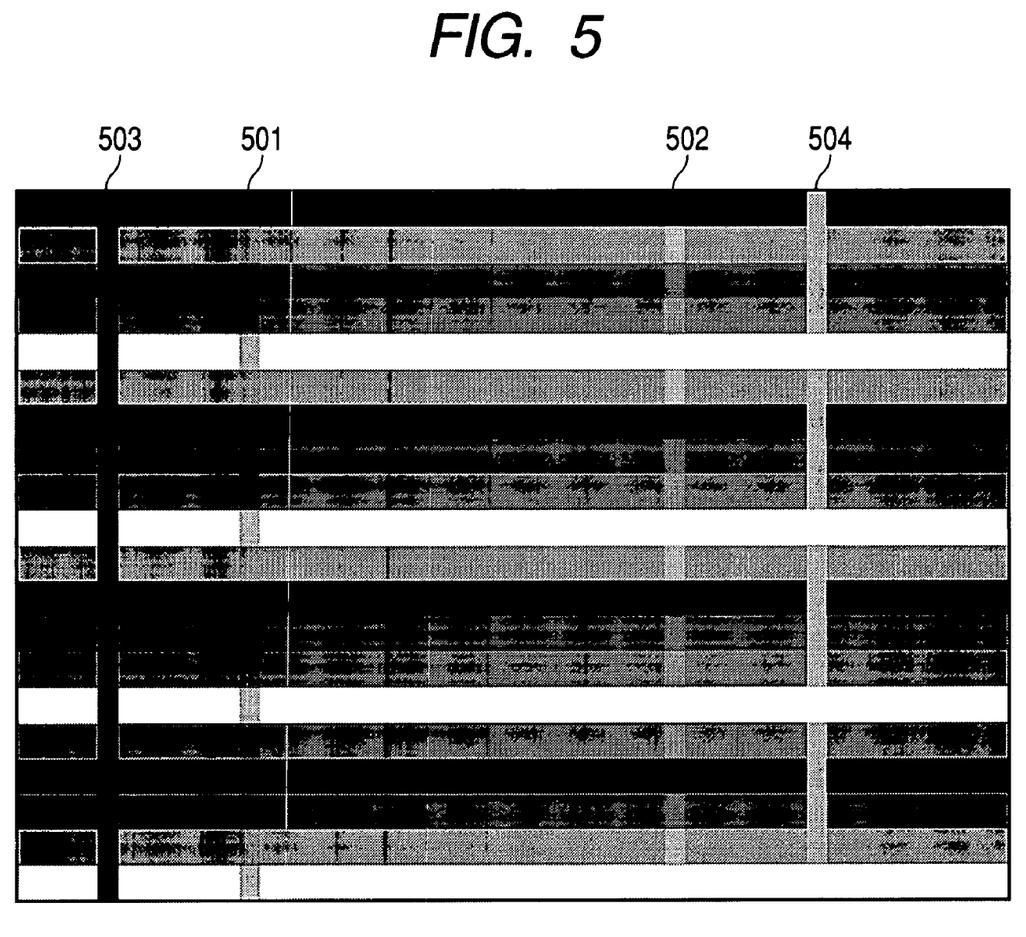
FIG. 5 is a diagram illustrating another example output result, of the test pattern image depicted in FIG. 3, output by the image output section 130.

FIG. 5 is a diagram illustrating another example output result of the test pattern image depicted in FIG. 3, output by the image output section 130. As illustrated in the diagram, in this case, there are generated a streak 503 whose density drastically deviates to a higher level than a desired level, and a streak 504 whose density drastically deviates to a lower level in addition to a density inconsistency (streak) 501 whose density deviates to a higher level than a desired density, or a density inconsistency (streak) 502 whose density deviates to a lower level. These streaks 503 and 504 are generated as a result of, e.g., insufficient cleaning or trimmer clogging, and cannot be resolved by means of correcting image signals.

When the test pattern image illustrated in FIG. 3 is utilized for correction of density inconsistencies, first, the density calculation unit 220 calculates a within-patch average density of each of 20 patches (five tone levels×4 sets) arranged in the sub scanning direction at each of given positions in the main scanning direction. Since the thus-calculated values include, in some cases, anomalous values resulting from noise generated in the image output section 130 or the image reading section 110, the density calculation unit 220 subsequently eliminates—among the data on the four within-patch average densities calculated on the patch of the respective density levels—data indicating the largest value and data indicating the smallest value as anomalous values, and takes an average value of the remaining two values as density data on the respective density level at each of the positions in the main scanning direction. As a result, a single density value is calculated for each of the density levels (in total, five density values), at each of the positions in the main scanning direction.

Figure 6:
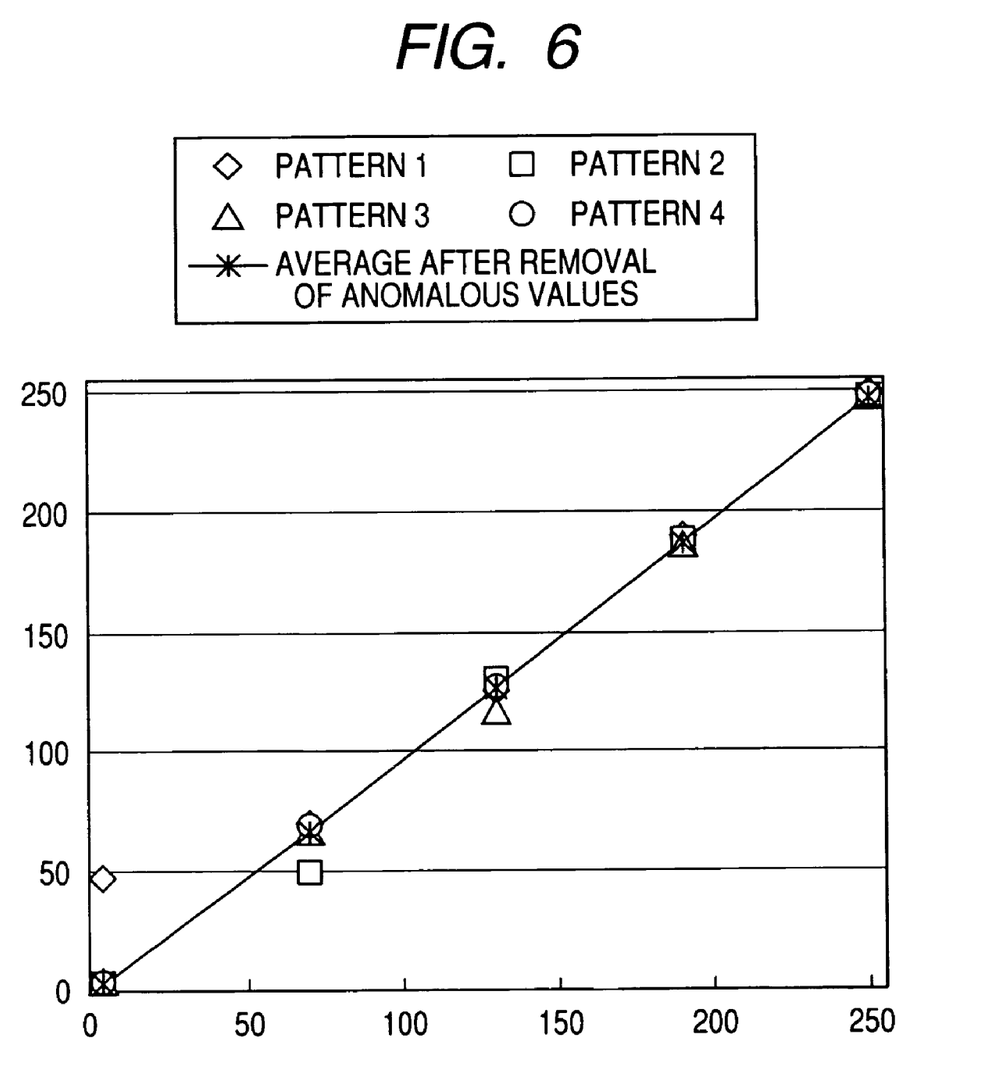
FIG. 6 is an example graph in which density data—at a specific position in the main scanning direction—calculated by the density calculation unit 220 are plotted.

FIG. 6 is an example graph in which density data—at a specific position in the main scanning direction—calculated by the density calculation unit 220 are plotted. In the graph, the horizontal axis represents density values of input image signals, and the vertical axis represents density values of an output result thereof. The graph also shows density data obtained prior to and subsequent to the above-described elimination processing of anomalous values and averaging processing (noise removal processing). As is apparent from the graph, the input density values and the output density values exhibit an ideal relationship at this position, by virtue of the noise removal processing.

Figure 7:
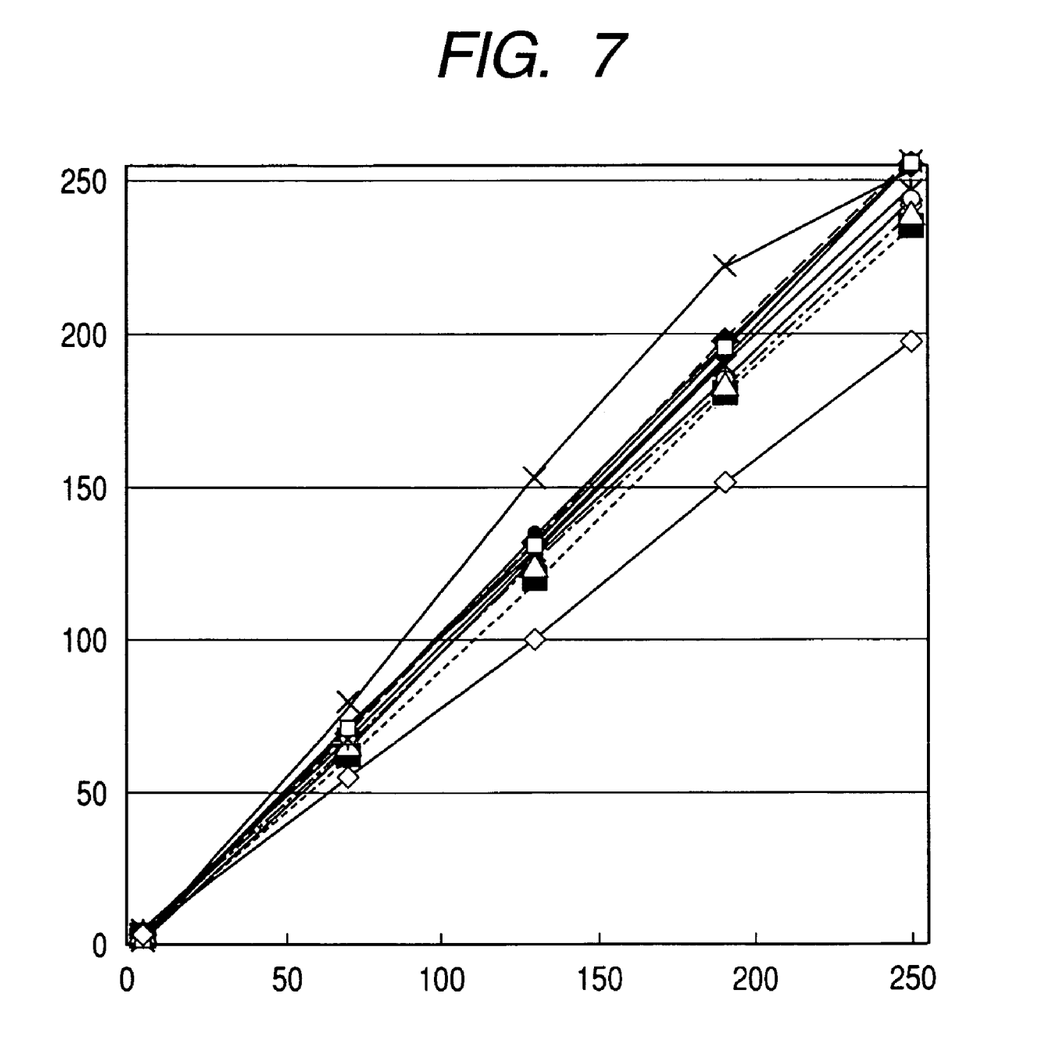
FIG. 7 is an example graph in which density data—at a plurality of positions in the main scanning direction—calculated by a density calculation unit 220 are plotted.

FIG. 7 is an example graph in which density data—at a plurality of positions in the main scanning direction—calculated by the density calculation unit 220 are plotted. As is apparent from the graph, the input density values and the output density values exhibit ideal relationships at most of the positions in the main scanning direction. However, two positions in the main scanning direction are deviated from ideal relationships. The two positions in the main scanning direction correspond to the positions in the main scanning direction where the streaks 401 and 402 illustrated in FIG. 4 arise.

Figure 8:
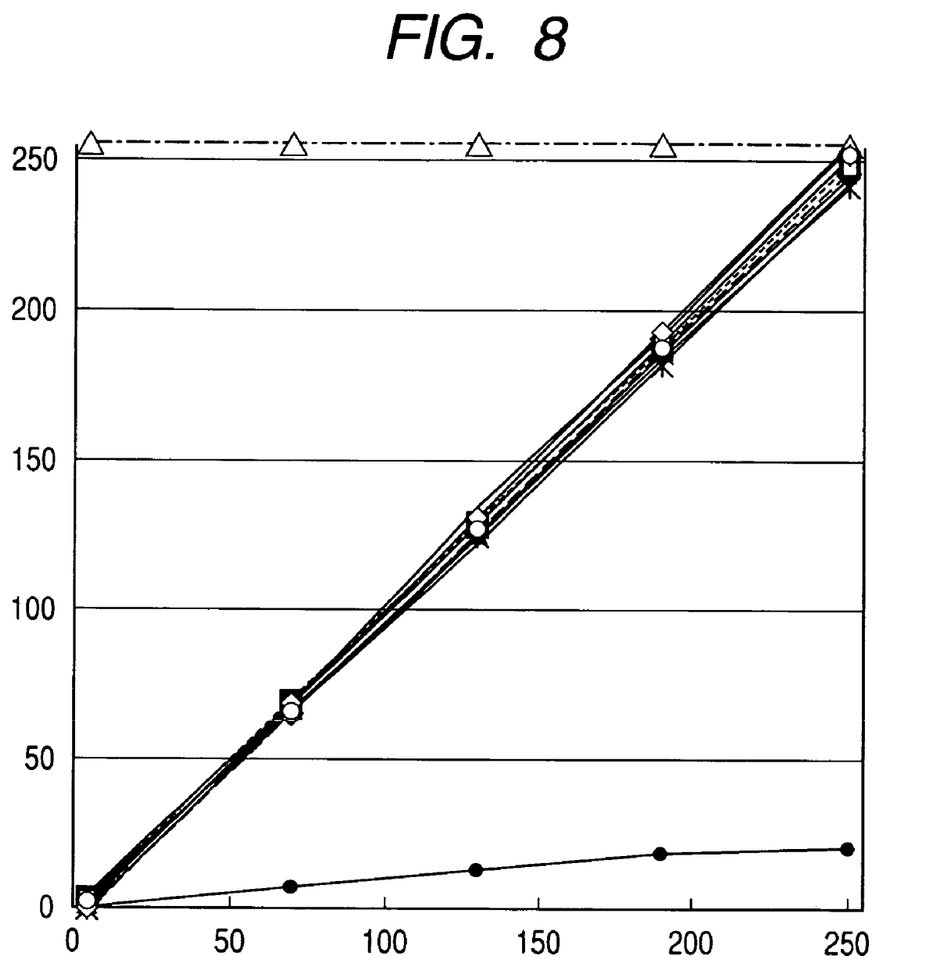
FIG. 8 is another example graph in which density data—at a plurality of positions in the main scanning direction—calculated by the density calculation unit 220 are plotted.

FIG. 8 is another example graph in which density data—at a plurality of positions in the main scanning direction—calculated by the density calculation unit 220 are plotted. Similarly, as is apparent from this graph, the input density values and the output density values exhibit ideal relationships at most of the positions in the main scanning direction. However, two positions in the main scanning direction are significantly deviated from ideal relationships. The two positions in the main scanning direction correspond to the positions in the main scanning direction where the streaks 503 and 504 illustrated in FIG. 5 arise.

On the basis of density data on respective patches having been calculated by the density calculation unit 220 for each of the given positions in the main scanning direction, the discrimination unit 230 discriminates whether or not density inconsistencies having arisen at the position of interest can be corrected (whether or not effects of tone correction can be sufficiently yielded at the position) for each of the given positions in the main scanning direction. For instance, a difference between a maximum value and a minimum value among density data on each of the positions in the main scanning direction is compared with a given threshold value (e.g., 100). When the difference between the maximum value and the minimum value is smaller than the given threshold value, the discrimination unit 230 discriminates that a streak and inconsistencies having arisen at the position in the main scanning direction cannot be corrected. On the other hand, when the difference between the maximum value and the minimum value is the given threshold value or larger, the discrimination unit 230 discriminates that effects of tone correction can be yielded sufficiently in the position in the main scanning direction, and density inconsistencies having arisen the position in the main scanning direction can be corrected.

Alternatively, the discrimination unit 230 may make a determination as follows: comparison is made between density data on respective patches and a density range (threshold value) corresponding to densities of the respective patches; and when the density data on all of the patches fall within the corresponding density range, the discrimination unit 230 determines that the density inconsistencies can be corrected; in contrast, when density data on anyone of patch fall outside the corresponding density range, the discrimination unit 230 determines that correction of the density inconsistencies is impossible. The density range (threshold value) in this case is a range including ideal density values of the respective patches.

For instance, when density data as illustrated in FIG. 7 are obtained from calculation by the density calculation unit 220, a difference between a maximum value and a minimum value is the given threshold value or larger (i.e., 100 or larger) at each of the positions in the main scanning direction. Therefore, the discrimination unit 230 discriminates that streaks and inconsistencies at all of the positions in the main scanning direction can be corrected. On the other hand, when density data as illustrated in FIG. 8 are obtained from calculation by the density calculation unit 220, a difference between a maximum value and a minimum value is smaller than the given threshold value (i.e., smaller than 100) at two positions in the main scanning direction. Therefore, the discrimination unit 230 discriminates that streaks and inconsistencies at these two positions in the main scanning direction cannot be corrected.

The correction parameter calculation unit 240 calculates a correction parameter for use in tone correction with regard to, for instance, a position in the main scanning direction for which tone has been discriminated to be correctable by the discrimination unit 230. More specifically, the correction parameter calculation unit 240 calculates a correction parameter for use in tone correction in order to achieve a desired density level in an output result, and sets the thus-calculated correction parameter to an LUT of the tone correction processing unit 210, or the like.

Next, a flow of density inconsistency correction processing in the image forming apparatus 100 having the above-described configuration will be described.

Figure 9:
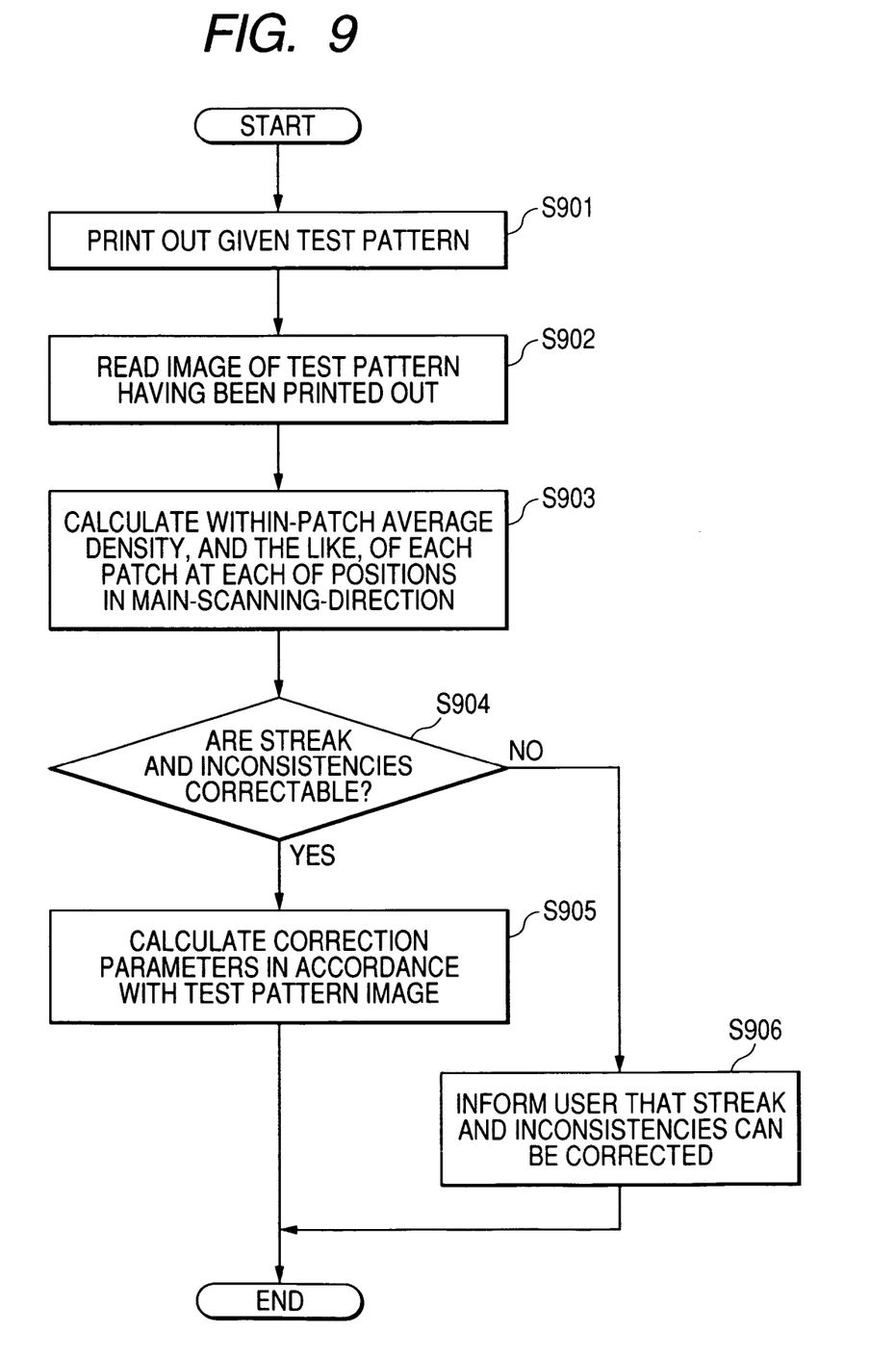
FIG. 9 is a chart showing a flow of correction parameter updating processing (calibration processing) for correcting density inconsistencies in an image forming apparatus 100.

FIG. 9 is a chart showing a flow of correction parameter updating processing (calibration processing) for correcting density inconsistencies in the image forming apparatus 100.

When an instruction is provided from a user, or the like, to perform correction (calibration) of a streak and inconsistencies of an image generated in the image output section 130, as illustrated in the chart, first, a given test pattern image (e.g., the test pattern image illustrated in FIG. 3) is output by the image output section 130 (S901).

When the test pattern image has been output, subsequently, a sheet on which the test pattern has been output is set on the image reading section 110 (e.g., placed on a platen glass), and the test pattern image is read from the output sheet (S902). The thus-read image data undergoes skew correction, positional correction, magnification correction, and gamma correction as appropriate; and is thereafter subjected to processing at a subsequent stage as image data corresponding to the position in the main scanning direction of the image output section 130. Meanwhile, resolution achieved at a position in the main scanning direction of the image data is set to, e.g., about 200 dpi.

Next, the density calculation unit 220 of the image processing section 120 calculates a within-patch average density of each of the patches, which form the test pattern image, for each of the given positions in the main scanning direction (S903).

Next, the discrimination unit 230 of the image processing section 120 discriminates whether or not density inconsistencies having arisen at the position of interest can be corrected, on the basis of the density data calculated for each of the given positions in the main scanning direction. When the result of the discrimination indicates that density inconsistencies in all of the positions in the main scanning direction are correctable (S904: Yes), the correction parameter calculation unit 240 of the image processing section 120 calculates a correction parameter for use in tone correction so as to attain desired density reproducibility, and sets the same in the tone correction processing unit 210 (S905).

On the basis of the thus-updated correction parameter, the tone correction processing unit 210 of the image processing section 120 performs tone correction processing of the image signals. Consequently, a streak and inconsistencies can be prevented from arising in an output result by the image output section 130.

Meanwhile, when a result of the discrimination indicates presence of a position in the main scanning direction of which density inconsistencies are non-correctable (S904: No), notification about a risk that an output result may have a streak and density inconsistencies which cannot be corrected is provided to a user, or the like, as appropriate (e.g., by means of displaying a message to this effect on a display panel) (S906). Meanwhile, the following configuration may also be adopted: after provision of the notification to the user, or the like, the correction parameter calculation unit 240 of the image processing section 120 calculates a correction parameter for use in tone correction of the positions in the main scanning direction where density inconsistencies can be corrected; and sets the correction parameter to the tone correction processing unit 210. In addition, the following configuration may also be adopted: in a case where a component causing the density inconsistencies which cannot be corrected through image processing can be identified, the user is urged to replace the component, or the like, in conjunction with the foregoing notification. In addition, the following configuration may also be applied: when the image forming apparatus 100 has any inconsistency-elimination means (a cleaning member for an electrification device, or the like), the inconsistency-elimination means is to be activated against the component which might be a cause of the density inconsistencies which cannot be corrected through image processing.

As described above, According to one aspect of the invention, there is provided an image forming apparatus includes: an image processing section for performing tone correction of an image signal, and an image output section for outputting an image in accordance with an image recording signal output by the image processing section. The image processing section includes: a tone correction processing unit which, in accordance with an input image signal, outputs an image signal having undergone tone correction; a density calculation unit for calculating a density value at a given position in a scanning direction of a test pattern image in accordance with an image signal pertaining to the input test pattern image; and a discrimination unit for discriminating whether or not density inconsistencies having arisen in the given position in the scanning direction can be corrected by the tone correction processing unit, on the basis of the density value calculated by the density calculation unit and a predetermined threshold value.

In relation to the above, the image processing apparatus may further have a correction parameter calculation unit for calculating a correction parameter for the tone correction processing unit in accordance with a result of discrimination by the discrimination unit.

In the foregoing image forming apparatus, the test pattern image has density values which, for instance, differ among positions in the sub scanning direction. In addition, the discrimination unit may compare the difference between the maximum value and the minimum value among the plurality of density values with the threshold value, thereby discriminating whether or not the density inconsistencies having arisen at the given position in the main scanning direction can be corrected by the tone correction processing unit. There may be further provided means for notifying a user, in a case where the discrimination unit discriminates that the density inconsistencies having arisen at the given position in the main scanning direction cannot be corrected by the tone correction processing unit, to this effect. Furthermore, there may be further provided an image reading section for reading the test pattern image.

An image processing apparatus according to one aspect of the invention includes: a density calculation unit for calculating a density value of a plurality of sub scanning directions of a given position in a main scanning direction of a test pattern image in accordance with an image signal pertaining to the input test pattern image; and a discrimination unit for discriminating whether or not density inconsistencies having arisen at the given position in the main scanning direction can be corrected through tone correction processing, on the basis of the density value calculated by the density calculation unit.

The above image processing apparatus may further have a correction parameter calculation unit for calculating a correction parameter for the tone correction processing in accordance with a result of discrimination by the discrimination unit.

Furthermore, in the foregoing image processing apparatus, the test pattern image has density values which, for instance, differ among the positions in the sub scanning direction. In addition, the discrimination unit may compare the difference between the maximum value and the minimum value among the plurality of density values with the threshold value, thereby discriminating whether or not the density inconsistencies having arisen at the given position in the main scanning direction can be corrected through the tone correction processing. Furthermore, there may be further provided means for notifying a user, in a case where the discrimination unit discriminates that the density inconsistencies having arisen at the given position in the main scanning direction cannot be corrected through the tone correction processing, of this effect.

According to one aspect of the invention, discrimination as to whether or not a streak and density inconsistencies in an output result by an image forming apparatus can be resolved by correction of image signals becomes possible.

According to one aspect of the invention, there is provided an image processing method includes: calculating a density value at a given position in the scanning direction of the test pattern image; and discriminating whether or not density inconsistencies having arisen at the given position in the scanning direction can be corrected through tone correction processing, on the basis of the density value calculated.

In relation to the above, the image processing method may further includes the step of calculating correction parameters for the tone correction processing in accordance with a result of discrimination.

Heretofore, an embodiment of the invention has been described. However, as a matter of course, an embodiment of the invention is not limited thereto. For instance, in the foregoing embodiment, discrimination as to whether or not density inconsistency correction through image processing is possible is made by the image processing section within the image forming apparatus. Alternatively, another configuration in which the discrimination is made by a separate image processing apparatus (correction parameter updating apparatus) having the density calculation unit 220, the discrimination unit 230, the correction parameter calculation unit 240, and the like, is also conceivable.

FIG. 1
110: IMAGE READING SECTION
120: IMAGE PROCESSING SECTION
130: IMAGE OUTPUT SECTION

FIG. 2
210: TONE CORRECTION PROCESSING UNIT
220: DENSITY CALCULATION UNIT
230: DISCRIMINATION UNIT
240: CORRECTION PARAMETER CALCULATION UNIT

FIG. 9
S901: PRINT OUT GIVEN TEST PATTERN
S902: READ IMAGE OF TEST PATTERN HAVING BEEN PRINTED OUT
S903: CALCULATE WITNIN-PATCH AVERAGE DENSITY, AND THE LIKE, OF EACH PATCH AT EACH OF POSITIONS IN MAIN-SCANNING-DIRECTION
S904: ARE STREAK AND INCONSISTENCIES CORRECTABLE?
S905: CALCULATE CORRECTION PARAMETERS IN AACCORDANCE WITH TEST PATTERN IMAGE
S906: INFORM USER THAT STREAK AND INCONSISTENCIES CAN BE CORRECTED

What is claimed is:

1. An image forming apparatus comprising:
    an image processing section for performing tone correction of an image signal; and
    an image output section for outputting an image in accordance with an image recording signal output by the image processing section, wherein
    the image processing section includes:
        a tone correction processing unit which, in accordance with an input image signal, outputs a tone corrected image signal having undergone tone correction;
        a density calculation unit for calculating a density value at a given position in a scanning direction of a test pattern image outputted from the image output section in accordance with an input test pattern image; and
        a discrimination unit for discriminating whether or not density inconsistencies having arisen at the given position in the scanning direction can be corrected by the tone correction processing unit based on the density value calculated by the density calculation unit and a predetermined threshold value.

2. The image forming apparatus according to claim 1, wherein:
    the density calculation unit calculates density values at a plurality of positions in a sub scanning direction with regard to a given position in the scanning direction of the test pattern image in accordance with image signals pertaining to the input test pattern image; and
    the discrimination unit discriminates whether or not the density inconsistencies can be corrected by the tone correction processing unit based on the density values at the plurality of positions calculated by the density calculation unit and a predetermined threshold value.

3. The image forming apparatus according to claim 1, wherein the discrimination unit discriminates whether or not the density inconsistencies can be corrected by the tone correction processing unit, by means of comparing a density value calculated by the density calculation unit on a given test pattern image, and a threshold value corresponding to a density of the given test pattern image.

4. The image forming apparatus according to claim 1, wherein the image processing section further has a correction parameter calculation unit for calculating a correction parameter for the tone correction processing unit in accordance with a result of discrimination by the discrimination unit.

5. The image forming apparatus according to claim 2, wherein the test pattern image has density values which differ among the positions in the sub scanning direction.

6. The image forming apparatus according to claim 2, wherein the discrimination unit discriminates whether or not the density inconsistencies having arisen at the given position in the scanning direction can be corrected by the tone correction processing unit, by means of comparing a difference between a maximum value and a minimum value among the density values at the plurality of positions with the threshold value.

7. The image forming apparatus according to claim 1, further comprising:
    a notification unit for notifying a user, when the discrimination unit discriminates that the density inconsistencies having arisen at the given position in the scanning direction cannot be corrected by the tone correction processing unit.

8. The image forming apparatus according to claim 1, further comprising:
    an image reading section for reading the test pattern image.

9. An image processing apparatus comprising:
    a density calculation unit for calculating, in accordance with an input test pattern image, a density value at a given position in a scanning direction of a test pattern image outputted from an image output section; and
    a discrimination unit for discriminating whether or not density inconsistencies having arisen at a given position in the scanning direction can be corrected through tone correction processing based on the density value calculated by the density calculation unit.

10. The image processing apparatus according to claim 9, further comprising:
    a correction parameter calculation unit for calculating a correction parameter for tone correction processing in accordance with a result of discrimination by the discrimination unit.

11. The image processing apparatus according to claim 9, wherein:
    the test pattern image has density values which differ among positions in a sub scanning direction;
    the density calculation unit calculates density values at a plurality of positions in the sub scanning direction with regard to a given position in the scanning direction of the test pattern image in accordance with an image signal pertaining to the input test pattern image; and
    the discrimination unit discriminates whether or not the density inconsistencies can be corrected by a tone correction processing unit based on the density values at the plurality of positions calculated by the density calculation unit and a predetermined threshold value.

12. The image processing apparatus according to claim 11, wherein the discrimination unit discriminates whether or not the density inconsistencies having arisen at the given position in the scanning direction can be corrected through tone correction processing, by comparing a difference between maximum value and a minimum value among the density values at the plurality of positions with a predetermined threshold value.

13. The image processing apparatus according to claim 9, further comprising:
    a notification unit for notifying a user, when the discrimination unit discriminates that the density inconsistencies having arisen the given position in the scanning direction cannot be corrected through tone correction processing.

14. An image processing method comprising:
    calculating a density value at a given position in a scanning direction of a test pattern image outputted from an image output section; and
    discriminating whether or not density inconsistencies having arisen at the given position in the scanning direction can be corrected through tone correction processing on the density value calculated.

15. The image processing method according to claim 14, further comprising:
    calculating correction parameters for tone correction processing in accordance with a result of a discrimination.

* * * * *